United States Patent
Nakamura et al.

(10) Patent No.: US 10,236,525 B2
(45) Date of Patent: *Mar. 19, 2019

(54) CONTROL APPARATUS, FUEL CELL UNIT AND CONTROL METHOD

(71) Applicant: KYOCERA CORPORATION, Kyoto (JP)

(72) Inventors: Kazutaka Nakamura, Yokohama (JP); Hiroshi Inoue, Kawasaki (JP); Kenta Okino, Yokohama (JP); Hirotaka Sato, Yokohama (JP); Takashi Shigehisa, Kirishima (JP); Takashi Ono, Kirishima (JP); Eiji Taniguchi, Moriyama (JP)

(73) Assignee: KYOCERA CORPORATION, Kyoto (JP)

( * ) Notice: Subject to any disclaimer, the term of this patent is extended or adjusted under 35 U.S.C. 154(b) by 1092 days.

This patent is subject to a terminal disclaimer.

(21) Appl. No.: 14/410,837

(22) PCT Filed: Jun. 26, 2013

(86) PCT No.: PCT/JP2013/067451
§ 371 (c)(1),
(2) Date: Dec. 23, 2014

(87) PCT Pub. No.: WO2014/003037
PCT Pub. Date: Jan. 3, 2014

(65) Prior Publication Data
US 2015/0333351 A1    Nov. 19, 2015

(30) Foreign Application Priority Data

Jun. 27, 2012 (JP) .................................. 2012-144815
Jul. 27, 2012 (JP) .................................. 2012-167809

(51) Int. Cl.
*H01M 8/04* (2016.01)
*H01M 8/04992* (2016.01)
(Continued)

(52) U.S. Cl.
CPC ........ *H01M 8/04992* (2013.01); *G05B 15/02* (2013.01); *H01M 8/0494* (2013.01);
(Continued)

(58) Field of Classification Search
CPC ......... H01M 8/04589; H01M 8/04619; H01M 8/04626; H01M 8/0701; H01M 8/0494;
(Continued)

(56) References Cited

U.S. PATENT DOCUMENTS 7,258,936 B2    8/2007 Zheng et al.
2004/0048118 A1    3/2004 Nakaji et al.
(Continued)

FOREIGN PATENT DOCUMENTS

EP    2869380 A1    5/2015
JP    2002-198079 A    7/2002
(Continued)

OTHER PUBLICATIONS

Office Action dated May 23, 2017 issued in counterpart Japanese Application No. 2012-144815.
(Continued)

*Primary Examiner* — Jane J Rhee
(74) *Attorney, Agent, or Firm* — Procopio Cory Hargreaves and Savitch LLP (57) ABSTRACT

A control apparatus includes a control unit which instructs a constant temperature mode to the fuel cell unit as one of operation modes, the constant temperature mode being a mode for performing an control to cover power consumption of the auxiliaries by power supplied from the outside and an control to keep a temperature of the power generation unit (Continued)

constant within a prescribed temperature range. In the constant temperature mode, power output from the power generation unit is at least smaller than the power consumption of the auxiliaries.

14 Claims, 5 Drawing Sheets

(51) Int. Cl.

| | | |
|---|---|---|
| G05B 15/02 | (2006.01) |
| H01M 8/04701 | (2016.01) |
| H01M 8/04828 | (2016.01) |
| H01M 8/06 | (2016.01) |
| H01M 8/04537 | (2016.01) |
| H01M 8/0612 | (2016.01) |
| H01M 8/0662 | (2016.01) |
| H01M 8/04007 | (2016.01) |
| H01M 8/124 | (2016.01) |

(52) U.S. Cl.
CPC ... *H01M 8/04589* (2013.01); *H01M 8/04619* (2013.01); *H01M 8/04626* (2013.01); *H01M 8/04701* (2013.01); *H01M 8/06* (2013.01); *H01M 8/04052* (2013.01); *H01M 8/0618* (2013.01); *H01M 8/0675* (2013.01); *H01M 2008/1293* (2013.01); *H01M 2250/402* (2013.01); *H01M 2250/405* (2013.01); *Y02B 90/12* (2013.01); *Y02B 90/16* (2013.01)

(58) Field of Classification Search
CPC .. H01M 8/06; H01M 8/04052; H01M 8/0618; H01M 8/0675; H01M 2008/1293; H01M 2250/402; H01M 2250/405
See application file for complete search history.

(56) References Cited

U.S. PATENT DOCUMENTS

| | | |
|---|---|---|
| 2004/0053093 A1 | 3/2004 | Colborn et al. |
| 2004/0161650 A1 | 8/2004 | Robert |
| 2007/0065689 A1 | 3/2007 | Edlund |

FOREIGN PATENT DOCUMENTS

| | | | |
|---|---|---|---|
| JP | 2002-269661 A | 9/2002 |
| JP | 2003-163013 A | 6/2003 |
| JP | 2003-288929 A | 10/2003 |
| JP | 2004-103287 A | 4/2004 |
| JP | 2004-103317 A | 4/2004 |
| JP | 2004-342584 A | 12/2004 |
| JP | 2005-026010 A | 1/2005 |
| JP | 2005-236348 A | 9/2005 |
| JP | 2006-012689 A | 1/2006 |
| JP | 2007-509470 A | 4/2007 |
| JP | 2008-022650 A | 1/2008 |
| JP | 2008-103236 A | 5/2008 |
| JP | 2008-262727 A | 10/2008 |
| JP | 2009-205868 A | 9/2009 |
| JP | 2010-015783 A | 1/2010 |

OTHER PUBLICATIONS

Office Action dated Nov. 17, 2015 issued in counterpart Japanese Patent Application No. 2012-167809.
Extended European Search Report dated Feb. 18, 2016 issued by the European Patent Office in corresponding European Patent Application No. 13810809.
Office Action dated Feb. 2, 2016 issued by the Japanese Patent Office in corresponding Japanese Patent Application No. 2012-144815.
International Search Report; PCT/JP2013/067451; dated Sep. 17, 2013.
Osaka Gas Co., Ltd.; "SOFC System Technological Development" [Online]; Retrieved Jun. 27, 2012; Internet (URL: http://www.osakagas.co.jp/rd/fuelcell/sofc/technology/system.html).
Office Action dated Oct. 11, 2016, issued in counterpart Japanese application No. 2012-144815.

CONTROL APPARATUS, FUEL CELL UNIT AND CONTROL METHOD

TECHNICAL FIELD

The present invention relates to a control apparatus which controls a fuel cell unit provided with a power generation unit and auxiliaries, and relates also to a fuel cell unit and a control method.

BACKGROUND ART

Recently, a fuel cell unit provided with a power generation unit which generates power upon chemical reaction and auxiliaries which assists an operation of the power generation unit has been known (for example, PTL 1). In a normal operation, output power (i.e., generated output) of the fuel cell unit is controlled to follow power consumption of a load provided on a power line which connects a grid and the fuel cell unit (i.e., load following control).

By the way, as an operation mode of the fuel cell unit, known is an operation mode for controlling output power of the power generation unit so that output power of the power generation unit becomes significantly the same as power consumption of the auxiliaries (hereafter, referred to as an idling mode) (for example, Patent Literature 2 and Patent Literature 1). For example, the idling mode is a mode for continuing the operation of the fuel cell unit in such a case where a power demand in a load is temporarily low.

CITATION LIST

Patent Literature

[Patent Literature 1] Japanese Patent Application Laid-open No. 2010-15783
[Patent Literature 2] Japanese Patent Application Laid-open No. 2006-12689

Non-Patent Literature

[Non-patent Literature 1] Osaka Gas Co., Ltd., "SOFC System Technological Development," [Online], retrieved Jun. 27, 2012, Internet (URL:http://www.osakagas.co.jp/rd/fuelcell/sofc/technology/system.html)

SUMMARY OF INVENTION

In the idling mode described above, however, it is necessary to supply the fuel cell unit with fuel (e.g., gas) to such a degree that the power generation unit can generate power to cover power consumption of the auxiliaries by the output power of the power generation unit. Therefore, it is not possible to sufficiently save fuel.

Then, the present invention has been made to solve the above-described problems and an object thereof is to provide a control apparatus, a fuel cell unit and a control method capable of sufficiently saving fuel.

A control apparatus according to a first feature controls a fuel cell unit provided with a power generation unit which generates power upon chemical reaction and auxiliaries which assists an operation of the power generation unit. The control apparatus includes a control unit which instructs a constant temperature mode to the fuel cell unit as one of operation modes, the constant temperature mode being a mode for performing an control to cover power consumption of the auxiliaries by power supplied from the outside and an control to keep a temperature of the power generation unit constant within a prescribed temperature range. In the constant temperature mode, power output from the power generation unit is at least smaller than the power consumption of the auxiliaries.

In the first feature, the prescribed temperature range is lower than a power generation temperature at the time of generating power in the power generation unit.

In the first feature, the control unit instructs a power generation mode as one of the operation mode, the power generation mode being a mode for controlling power output from the power generation unit so as to follow power consumption of a load connected to the fuel cell unit. The control unit instructs to set the operation mode of the fuel cell unit to the constant temperature mode, when power output from the power generation unit in the power generation mode is smaller than a prescribed threshold value.

In the first feature, the control unit instructs an idling mode as one of the operation mode, the idling mode is a mode for outputting power from the power generation unit in accordance with the power consumption of the auxiliaries.

In the first feature, the control unit instructs to set the operation mode of the fuel cell unit to the idling mode in case of a power failure.

In the first feature, the power generation unit includes a SOFC fuel cell.

In the first feature, the power generation temperature is 650 to 1000° C. and the prescribed temperature range is 450 to 600° C.

In the first feature, an amount of fuel gas supplied to the fuel cell unit in the constant temperature mode is smaller than an amount of fuel gas supplied to the fuel cell unit in the power generation mode.

In the first feature, the control unit instructs a power generation mode as one of the operation mode, the power generation mode is a mode for controlling power output from the power generation unit so as to follow power consumption of a load connected to the fuel cell unit. The control unit calculates cost of fuel required for the fuel cell unit to cover power consumption of the load and cost of power supplied from a power source other than the fuel cell unit, for each of the operation modes of the fuel cell unit, and instructs a low-cost operation mode based on a calculated cost.

In the first feature, the control unit instructs an idling mode as one of the operation mode, the idling mode is a mode for outputting power from the power generation unit in accordance with the power consumption of the auxiliaries. The control unit calculates cost of fuel required for the fuel cell unit and cost of power supplied from a power source other than the fuel cell unit, for each of the constant temperature mode and the idling mode, when power consumption of the load is smaller than a prescribed threshold value, and instructs a low-cost operation mode based on a calculated cost.

A fuel cell unit according to a second feature is provided with a power generation unit which generates power upon chemical reaction and auxiliaries which assists an operation of the power generation unit. The fuel cell unit includes a control unit configured to control the fuel cell unit according to operation modes including a power generation mode and a constant temperature mode, the power generation mode being a mode for positively performing power generation by the power generation unit, the constant temperature mode being a mode for keeping a temperature of the power generation unit constant within a prescribed temperature range while covering power consumption of the auxiliaries by power supplied from the outside. In the constant temperature mode, power output from the power generation unit is at least smaller than the power consumption of the auxiliaries.

In the second feature, the control unit calculates cost of fuel required for the fuel cell unit to cover power consumption of the load and cost of power supplied from a power source other than the fuel cell unit, for each of the operation modes of the fuel cell unit, and instructs a low-cost operation mode based on a calculated cost.

A control method according to a third feature is a method for controlling a fuel cell unit provided with a power generation unit which generates power upon chemical reaction and auxiliaries which assists an operation of the power generation unit. The control method includes a step of instructing one of operation modes of the fuel cell unit. The operation modes of the fuel cell unit includes a constant temperature mode that is a mode for performing a control to cover consumption of the auxiliaries by power supplied from the outside and a control to keep a temperature of the power generation unit constant within a prescribed temperature range. In the constant temperature mode, power output from the power generation unit is at least smaller than the power consumption of the auxiliaries.

In the third feature, the operation modes of the fuel cell unit includes a power generation mode that is a mode for controlling power output from the power generation unit so as to follow power consumption of a load connected to the fuel cell unit. The step includes a step of calculating cost of fuel required for the fuel cell unit to cover power consumption of the load and cost of power supplied from a power source other than the fuel cell unit, for each of the operation modes of the fuel cell unit, and a step of instructing a low-cost operation mode based on the calculated cost.

According to the present invention, it is possible to provide a control apparatus, a fuel cell unit and a control method capable of sufficiently saving fuel.

DESCRIPTION OF EMBODIMENTS

Hereinafter, an alert presentation apparatus and an alert presenting method according to an embodiment of the present invention will be described with reference to the drawings. In the following drawings, identical or similar components are denoted by identical or similar reference numerals.

It should be understood that the drawings are schematic only and the ratio of dimensions is not to scale. Therefore, specific dimensions should be determined with reference to the description below. It is needless to mention that different relationships and ratio of dimensions may be included in different drawings.

Outline of Embodiments

A control apparatus according to embodiments controls a fuel cell unit provided with a power generation unit which generates power upon chemical reaction and auxiliaries which assists an operation of the power generation unit. The control apparatus includes a control unit which instructs a constant temperature mode to the fuel cell unit as one of operation modes, the constant temperature mode being a mode for performing an control to cover power consumption of the auxiliaries by power supplied from the outside and an control to keep a temperature of the power generation unit constant within a prescribed temperature range. In the constant temperature mode, power output from the power generation unit is at least smaller than the power consumption of the auxiliaries.

In an embodiment, the operation modes including the constant temperature mode are introduced. Therefore, even in a case where the fuel cell unit is made not to stop completely as much as possible in order to secure load followability, fuel gas supplied to the fuel cell unit can be saved in the constant temperature mode.

First Embodiment (Energy Management System)

Figure 1:
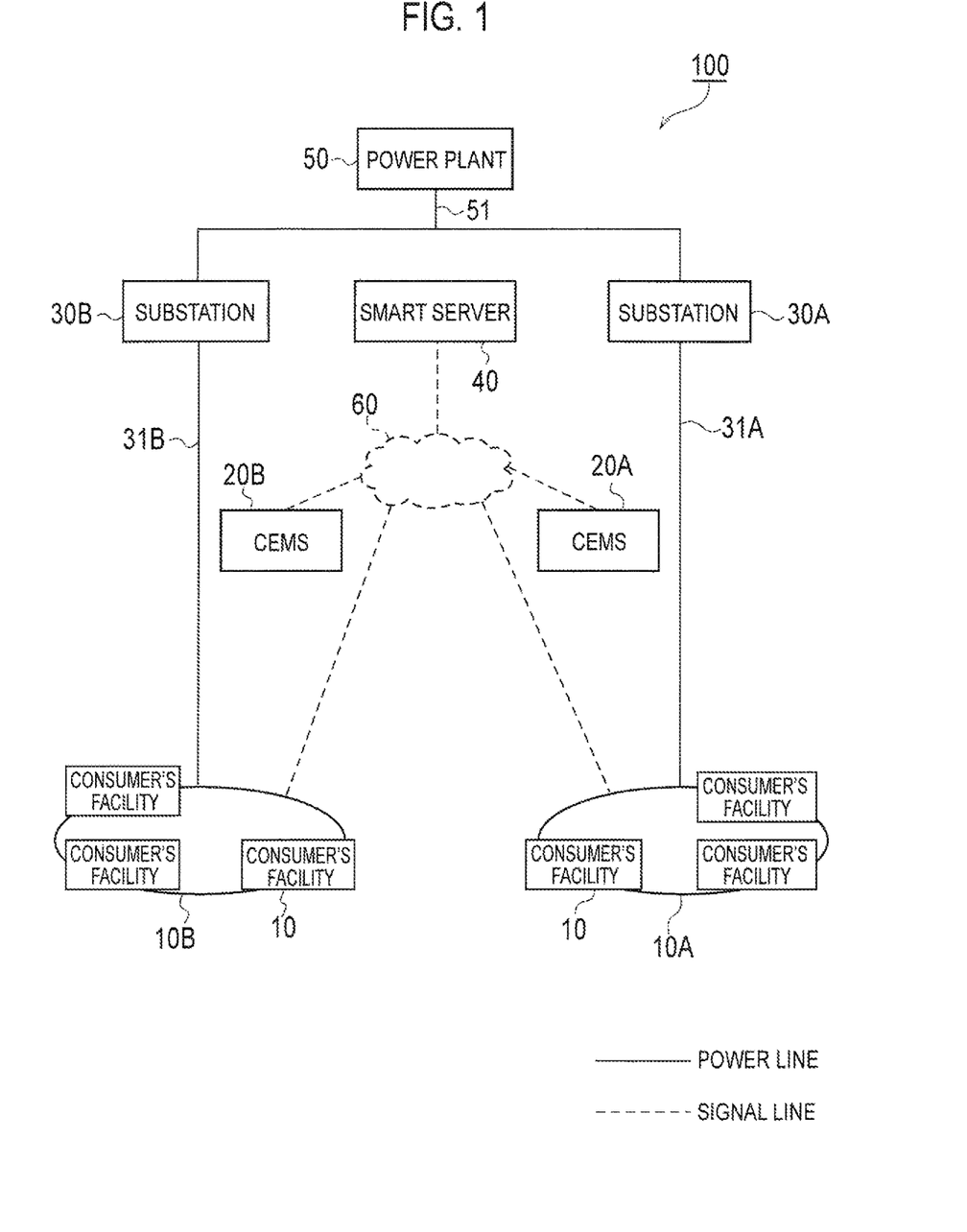
FIG. 1 is a diagram illustrating an energy management system 100 according to a first embodiment.

Hereinafter, an energy management system according to a first embodiment will be described. FIG. 1 is a diagram illustrating an energy management system 100 according to the first embodiment.

As illustrated in FIG. 1, the energy management system 100 is provided with a consumer's facility 10, a CEMS 20, a substation 30, a smart server 40 and a power plant 50. The consumer's facility 10, the CEMS 20, the substation 30 and the smart server 40 are connected via a network 60.

The consumer's facility 10 is provided with, for example, a power generating apparatus and a power storage apparatus. The power generating apparatus is, for example, an apparatus which outputs power using fuel gas like a fuel cell. The power storage apparatus is, for example, an apparatus which stores power like a secondary battery.

The consumer's facility 10 may be a residence such as a detached house, or housing complex such as a condominium. The consumer's facility 10 may be a store such as a corner store or a supermarket, a commercial institution such as a building, or a factory.

In the first embodiment, a consumer's facility group 10A and a consumer's facility group 10B are constituted by a plurality of consumer facilities 10. The consumer's facility group 10A and the consumer's facility group 10B are classified according to, for example, geographical areas.

The CEMS 20 controls interconnection between a plurality of consumer facilities 10 and a power system. Note that the CEMS 20 may be referred to as CEMS (Cluster/Community Energy Management System) because the CEMS 20 manages a plurality of consumer facilities 10. In particular, the CEMS 20 disconnects a plurality of consumer facilities 10 from the power system at the time of, for example, a power failure. On the other hand, the CEMS 20 performs interconnection between a plurality of consumer facilities 10 and the power system at the time of, for example, power return.

In the first embodiment, a CEMS 20A and a CEMS 20B are provided. The CEMS 20A controls, for example, interconnection between the consumer facilities 10 included in the consumer's facility group 10A and the power system. The CEMS 20B controls, for example, interconnection between the consumer facilities 10 included in the consumer's facility group 10B and the power system.

The substation 30 supplies a plurality of consumer facilities 10 with power via a distribution line 31. In particular, the substation 30 lowers a voltage supplied from the power plant 50.

In the first embodiment, a substation 30A and a substation 30B are provided. The substation 30A supplies power to, for example, the consumer facilities 10 included in the consumer's facility group 10A via a distribution line 31A. The substation 30B supplies power to, for example, the consumer facilities 10 included in the consumer's facility group 10B via a distribution line 31B.

The smart server 40 manages a plurality of CEMS 20 (here, the CEMS 20A and the CEMS 20B). Further, the smart server 40 manages a plurality of substations 30 (here, the substation 30A and the substation 30B). In other words, the smart server 40 collectively manages consumer facilities 10 included in the consumer's facility group 10A and the consumer's facility group 10B. The smart server 40 has, for example, a function to balance the power to be supplied to the consumer's facility group 10A and the power to be supplied to the consumer's facility group 10B.

The power plant 50 generates power by fire power, solar power, wind power, hydraulic power, atomic power and the like. The power plant 50 supplies a plurality of substations 30 (here, the substation 30A and the substation 30B) with power via a power line 51.

The network 60 is connected to each apparatus via a signal line. The network 60 is, for example, the Internet, a broadband communication network, a narrowband communication network, or a portable telephone network, and the like.

(Consumer's Facility)

Figure 2:
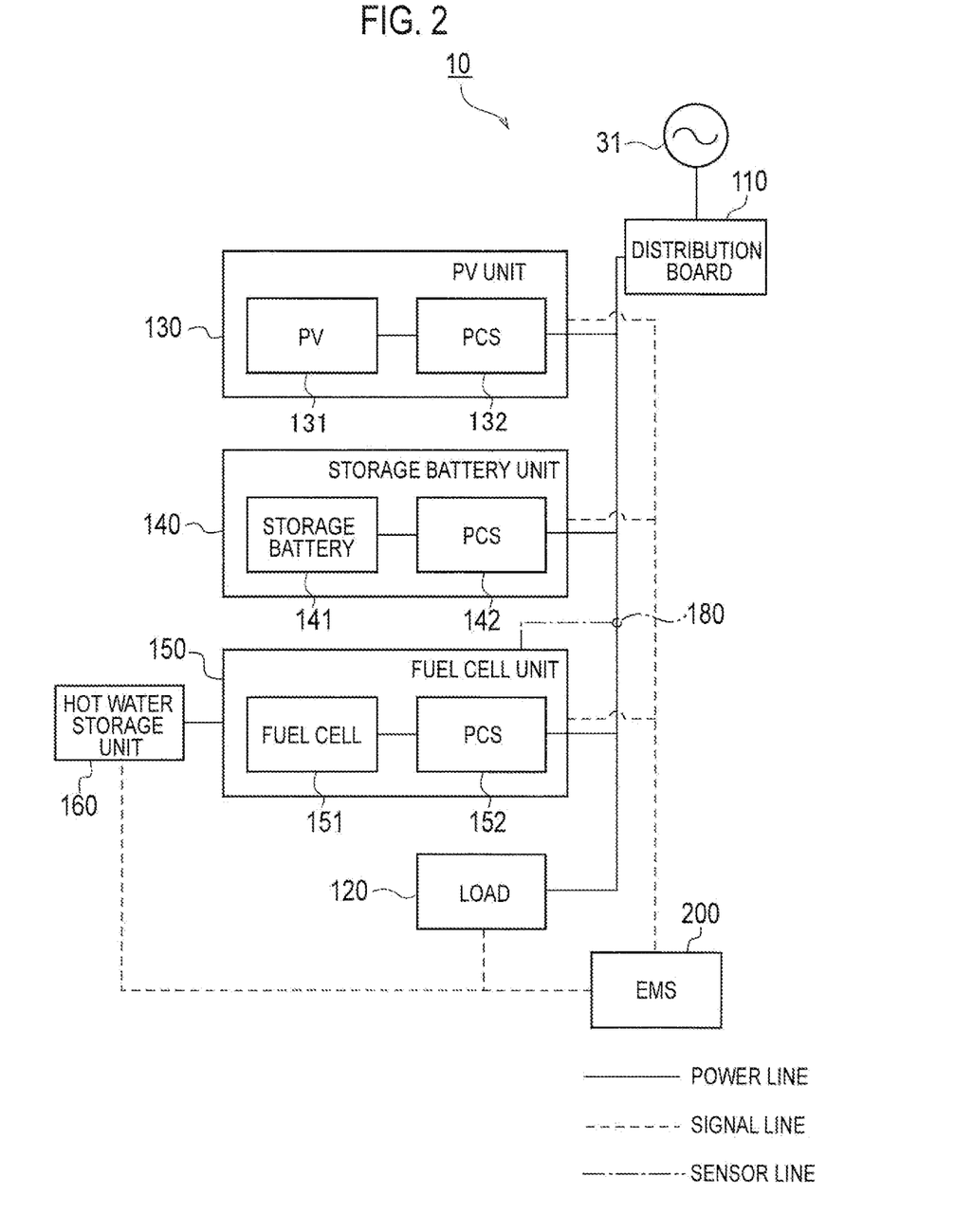
FIG. 2 is a diagram illustrating a consumer's facility 10 according to the first embodiment.

Hereinafter, the consumer's facility according to the first embodiment will be described. FIG. 2 is a diagram illustrating details of the consumer's facility 10 according to the first embodiment.

As illustrated in FIG. 2, the consumer's facility 10 is provided with a distribution board 110, a load 120, a PV unit 130, a storage battery unit 140, a fuel cell unit 150, a hot water storage unit 160 and the EMS 200.

In the first embodiment, the consumer's facility 10 is provided with an ammeter 180. The ammeter 180 is used for the load following control of the fuel cell unit 150. The ammeter 180 is provided on a power line connecting the storage battery unit 140, the fuel cell unit 150 and the grid at a position in a downstream from a junction point of the storage battery unit 140 and the power line (i.e., on the side separated from the grid) and in an upstream of the junction point of the fuel cell unit 150 and the power line (i.e., on the side close to the grid). It is needless to mention that the ammeter 180 is provided at a position in an upstream of a junction point of the load 120 and the power line (i.e., on the side close to the grid).

In the first embodiment, it should be noted that each unit is connected to the power line in an order of the PV unit 130, the storage battery unit 140, the fuel cell unit 150 and the load 120 when seen in the order closer to the grid.

The distribution board 110 is connected to the distribution line 31 (i.e., the grid). The distribution board 110 is connected to the load 120, the PV unit 130, the storage battery unit 140 and the fuel cell unit 150 via a power line. However, the connection between the fuel cell unit 150 and the storage battery unit 140 may be reversed.

The load 120 is an apparatus which consumes power supplied via the power line. For example, the load 120 includes an apparatus, such as a refrigerator, a freezer, a lighting apparatus and an air conditioner.

The PV unit 130 is provided with a PV 131 and a PCS 132. The PV 131 is an exemplary power generating apparatus, and is a photovoltaic power generating apparatus which generates power upon reception of sunlight. The PV 131 outputs generated DC power. An amount of generated power of the PV 131 changes depending on an amount of solar radiation with which the PV 131 is irradiated. The PCS 132 is an apparatus which converts DC power output from the PV 131 into AC power (i.e., a Power Conditioning System). The PCS 132 outputs the AC power to the distribution board 110 via the power line.

In the first embodiment, the PV unit 130 may be provided with a pyranometer for measuring the amount of solar radiation with which the PV 131 is irradiated.

The PV unit 130 is controlled by the MPPT (Maximum Power Point Tracking) method. In detail, the PV unit 130 optimizes an operating point of the PV 131 (i.e., a point defined by an operating point voltage value and a point defined by the power value, or the operating point voltage value and a current value).

The storage battery unit 140 is provided with a storage battery 141 and a PCS 142. The storage battery 141 is an apparatus which stores power. The PCS 142 is an apparatus (i.e., a Power Conditioning System) which converts AC power supplied from the distribution line 31 (i.e., the grid) into DC power. Further, the PCS 142 converts the DC power output from the storage battery 141 into AC power.

The fuel cell unit 150 is provided with a fuel cell 151 and a PCS 152. The fuel cell 151 is an exemplary power generating apparatus, and is an apparatus which outputs power using fuel gas. The PCS 152 is an apparatus which converts DC power output from the fuel cell 151 into AC power (i.e., a Power Conditioning System).

The fuel cell unit 150 is operated by load following control. In detail, the fuel cell unit 150 controls the fuel cell 151 so that power output from the fuel cell 151 becomes the target power of the load following control. A configuration of the fuel cell unit 150 will be described later.

The hot water storage unit 160 is an exemplary heat storage apparatus which converts power into heat and stores the converted heat as hot water or stores heat generated by a cogeneration apparatus, such as the fuel cell unit 150, as hot water. In particular, the hot water storage unit 160 is provided with a hot water storage tank and heats water supplied from the hot water storage tank with exhaust heat produced by operation (i.e., power generation) of the fuel cell 151. In detail, the hot water storage unit 160 heats water supplied from the hot water storage tank and flows back the heated hot water to the hot water storage tank.

The EMS 200 is an apparatus which controls the PV unit 130, the storage battery unit 140, the fuel cell unit 150 and the hot water storage unit 160 (i.e., an Energy Management System). In particular, the EMS 200 is connected to the PV unit 130, the storage battery unit 140, the fuel cell unit 150 and the hot water storage unit 160 via a signal line and controls the PV unit 130, the storage battery unit 140, the fuel cell unit 150 and the hot water storage unit 160. Further, the EMS 200 controls power consumption of the load 120 by controlling an operation mode of the load 120.

The EMS 200 is connected to various servers via the network 60. Various servers store information including, for example, a purchase unit price of the power supplied from the grid, a sales unit price of the power supplied from the grid and a purchase unit price of the fuel gas (hereafter, referred to as energy rate information).

Alternatively, various servers store information used for, for example, predicting power consumption of the load 120 (hereafter, referred to as energy consumption prediction information). The energy consumption prediction information may be, for example, generated based on a past actual value of power consumption of the load 120. Alternatively, the energy consumption prediction information may be a model of power consumption of the load 120.

Alternatively, various servers store, for example, information (hereafter, referred to as prediction information about the amount of generated PV power) used for predicting the amount of generated power of the PV 131. The PV power generation prediction information may be a predictive value of the amount of solar radiation with which the PV 131 is irradiated. Alternatively, the PV power generation prediction information may be weather report, season, daylight hours and the like.

(Fuel Cell Unit)

Figure 3:
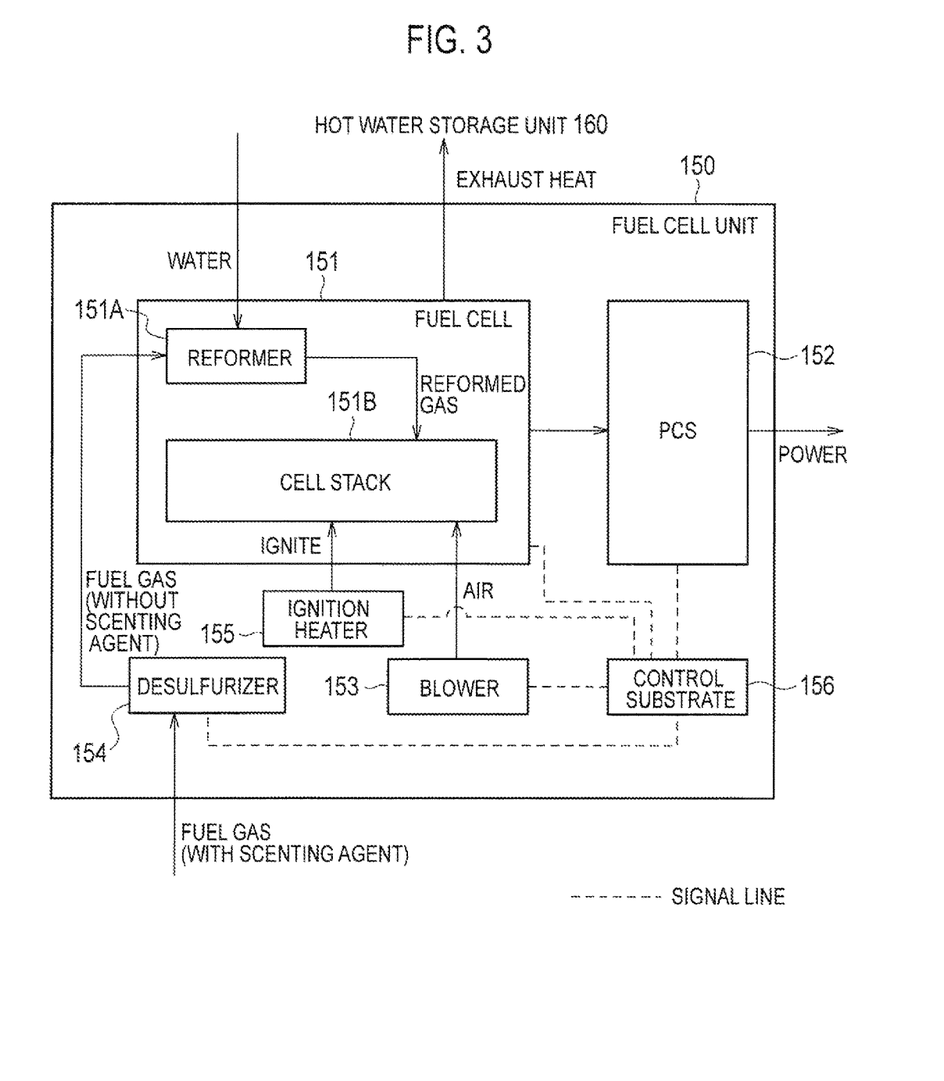
FIG. 3 is a diagram illustrating a fuel cell unit 150 according to the first embodiment.

Hereinafter, the fuel cell unit according to the first embodiment will be described. FIG. 3 is a diagram illustrating the fuel cell unit 150 according to the first embodiment.

As shown in FIG. 3, the fuel cell unit 150 is provided with a fuel cell 151, a PCS 152, a blower 153, a desulfurizer 154, an ignition heater 155 and a control substrate 156.

The fuel cell 151 is, as described above, an apparatus which outputs power using fuel gas. The fuel cell 151 is, for example, a SOFC (Solid Oxide Fuel Cell) fuel cell. In particular, the fuel cell 151 is provided with a reformer 151A and a cell stack 151B.

The reformer 151A generates reformed gas from the fuel gas with which a scenting agent has been removed by the later-described desulfurizer 154. The reformed gas is the gas constituted by hydrogen and carbon monoxide.

The cell stack 151B generates power upon chemical reaction of air (i.e., oxygen) supplied from the later-described blower 153 and the reformed gas. In particular, the cell stack 151B has a structure in which cells are stacked. Each cell has a structure in which an electrolyte is disposed between a fuel electrode and an air electrode. The reformed gas (i.e., hydrogen) is supplied to the fuel electrode and air (i.e., oxygen) is supplied to the air electrode. A chemical reaction between the reformed gas (i.e., hydrogen) and air (i.e., oxygen) is caused in the electrolyte, whereby power (DC power) and heat are generated.

The PCS 152 is an apparatus which converts DC power output from the fuel cell 151 into AC power as described above.

The blower 153 supplies the fuel cell 151 (i.e., the cell stack 151B) with air. The blower 153 is configured by, for example, a fan.

The desulfurizer 154 removes the scenting agent included in the fuel gas supplied from the outside. The fuel gas may be, for example, city gas or LP gas.

The ignition heater 155 is a heater which ignites fuel which has not chemically reacted in the cell stack 151B (hereafter, referred to as unreacted fuel) and maintains a temperature of the cell stack 151B at a high temperature. That is, the ignition heater 155 ignites the unreacted fuel leaking from an opening of each cell which configures the cell stack 151B. It is to be noted that, in a case where the unreacted fuel is not burning (for example, at the time of start-up of the fuel cell unit 150), it is only necessary that the ignition heater 155 should ignite the unreacted fuel. Once ignited, the temperature of the cell stack 151B is maintained at a high temperature by the unreacted fuel which leaks in a small amount from the cell stack 151B continuously burning thereafter.

The control substrate 156 is a substrate on which a circuit that controls the fuel cell 151, the PCS 152, the blower 153, the desulfurizer 154, the ignition heater 155 and the control substrate 156 is mounted.

In the first embodiment, the cell stack 151B is an exemplary power generation unit which generates power upon chemical reaction. The reformer 151A, the blower 153, the desulfurizer 154, the ignition heater 155 and the control substrate 156 are exemplary auxiliaries that assist the operation of the cell stack 151B (i.e., the power generation unit). Alternatively, a part of the PCS 152 may be treated as the auxiliaries.

In the first embodiment, a power generation mode, an idling mode and the constant temperature mode are provided as the operation mode of the fuel cell unit 150.

The power generation mode is an operation mode for controlling power output from the fuel cell 151 (i.e., the cell stack 151B) so as to follow the power consumption of the load 120 connected to the fuel cell unit 150 (i.e., load following control). In detail, in the power generation mode, the power output from the fuel cell 151 is controlled so that a product of a current value detected by the ammeter 180 and power detected by the PCS 152 becomes target received power. Here, since the fuel cell unit 150 is provided at a position downstream of the ammeter 180, it should be noted that power consumption of the auxiliaries is covered also by the power output from the fuel cell 151.

Here, the temperature of the cell stack 151B in the power generation mode is maintained at 650 to 1000° C. (for example, about 700° C.) by the chemical reaction and the burning of the unreacted fuel. Such a temperature range (hereafter, referred to as the power generation temperature) is a temperature range in which a chemical reaction is caused positively if reformed gas (i.e., hydrogen) and air (i.e., oxygen) are obtained.

By the way, the fuel cell unit 150 can also be stopped completely. For example, the fuel cell unit 150 may be stopped completely when the fuel cell unit 150 is not used for a long time. When the fuel cell unit 150 is stopped completely, however, the auxiliaries is also stopped and the temperature of the fuel cell 151 (i.e., the cell stack 151B) is lowered. Therefore, it takes long time to rise the temperature of the fuel cell 151 (i.e., the cell stack 151B) to the power generation temperature, whereby load followability decreases. Therefore, in the first embodiment, in order to avoid complete stop of the fuel cell unit 150 as much as possible, the idling mode and the constant temperature mode are provided as the operation mode of the fuel cell unit 150.

The idling mode is the operation mode for controlling the power output from the fuel cell 151 (i.e., the cell stack 151B) in accordance with the power consumption of the auxiliaries. Therefore, it should be noted that, in the idling mode, power consumption of the load 120 is not covered by the power output from the fuel cell 151.

Here, the temperature of the cell stack 151B in the idling mode is maintained by the chemical reaction and the burning of the unreacted fuel at a power generation temperature which is the same as the temperature in the power generation mode (for example, about 700° C.). That is, the temperature of the cell stack 151B in the idling mode is, in the same manner as in the power generation mode, a temperature range in which a chemical reaction is caused positively if reformed gas (i.e., hydrogen) and air (i.e., oxygen) are obtained. The idling mode is an operation mode applied, for example, in case of a power failure.

The constant temperature mode is an operation mode in which the cell stack 151B is kept constant within a prescribed temperature range while covering the power consumption of the auxiliaries by the power supplied from the outside. In the constant temperature mode, power consumption of the auxiliaries may be covered by the power supplied from the grid, or may be supplied with the power supplied from the PV 131 or the storage battery 141. In the constant temperature mode, the power output from the fuel cell 151 (i.e., the cell stack 151B) is at least smaller than the power consumption of the auxiliaries and is about slightly insufficient to operate the auxiliaries as in the idling mode. For example, in the constant temperature mode, power is not output from the fuel cell 151 (i.e., the cell stack 151B).

Here, the temperature of the cell stack 151B in the constant temperature mode is kept mainly by the burning of the unreacted fuel. Further, the temperature of the cell stack 151B in the constant temperature mode is lower than the temperature of the cell stack 151B in the power generation mode. Similarly, the temperature of the cell stack 151B in the constant temperature mode is lower than the temperature of the cell stack 151B in the idling mode. However, the temperature of the cell stack 151B in the constant temperature mode is kept at a certain high temperature (i.e., prescribed temperature range) by the burning of the unreacted fuel.

In the first embodiment, the prescribed temperature range is slightly lower than the power generation temperature and, for example, is about 450 to 600° C., in which sufficient chemical reaction is not easily caused even if reformed gas (i.e., hydrogen) and air (i.e., oxygen) are obtained. Since a reaction speed in the chemical reaction becomes insufficient when the temperature of the cell stack 151B is in the prescribed temperature range, a voltage output from the fuel cell 151 (i.e., the cell stack 151B) is lower than a rated voltage (for example, 200 V). In the constant temperature mode, the chemical reaction needs not to occur at all or some chemical reactions may occur. In the constant temperature mode, however, the temperature of the fuel cell 151 (i.e., the cell stack 151B) is kept constant within the prescribed temperature range which is obviously higher than a normal temperature. Therefore, even when it becomes necessary to generate power, time until the temperature of the fuel cell 151 (i.e., the cell stack 151B) reaches the power generation temperature is shorter as compared with a state in which the fuel cell unit 150 is completely stopped. Therefore, in the constant temperature mode, the time until necessary power is output may be shortened (i.e., load followability is high).

Further, an amount of fuel gas supplied to the fuel cell unit 150 in the constant temperature mode is smaller than an amount of fuel gas supplied to the fuel cell unit 150 in the power generation mode.

(Configuration of EMS)

Figure 4:
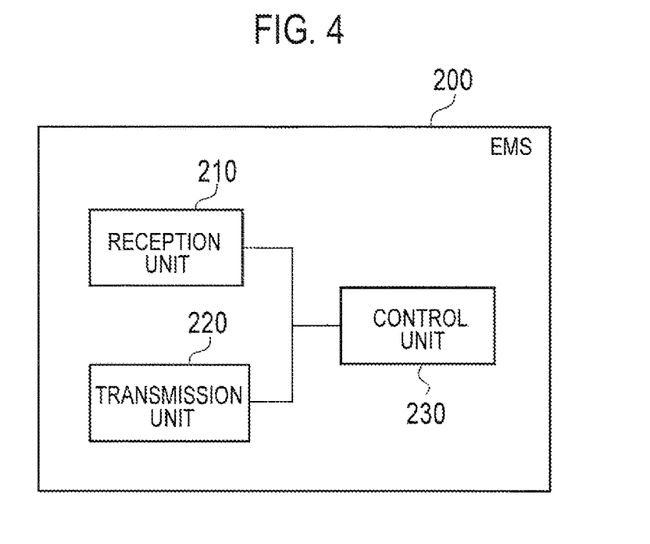
FIG. 4 is a diagram illustrating an EMS 200 according to the first embodiment.

Hereinafter, the EMS of the first embodiment will be described. FIG. 4 is a block diagram illustrating the EMS 200 of the first embodiment.

As illustrated in FIG. 4, the EMS 200 is provided with a reception unit 210, a transmission unit 220 and a control unit 230.

The reception unit 210 receives various signals from the apparatuses connected via the signal line. For example, the reception unit 210 may receive, from the PV unit 130, information which indicates the amount of generated power of the PV 131. The reception unit 210 may receive, from the storage battery unit 140, information which indicates an amount of stored power of the storage battery 141. The reception unit 210 may receive, from the fuel cell unit 150, information which indicates an amount of generated power of the fuel cell 151. The reception unit 210 may receive, from the hot water storage unit 160, information which indicates an amount of stored hot water of the hot water storage unit 160.

In the first embodiment, the reception unit 210 may receive, from various servers, the energy rate information, the energy consumption prediction information and the prediction information about the amount of generated PV power via the network 60. However, the energy rate information, the energy consumption prediction information and the prediction information about the amount of generated PV power may be stored in the EMS 200 in advance.

The transmission unit 220 transmits various signals to the apparatuses connected via the signal line. For example, the transmission unit 220 transmits, to each unit, signals for controlling the PV unit 130, the storage battery unit 140, the fuel cell unit 150 and the hot water storage unit 160. The transmission unit 220 transmits, to the load 120, a control signal for controlling the load 120.

The control unit 230 controls the load 120, the PV unit 130, the storage battery unit 140, the fuel cell unit 150 and the hot water storage unit 160 using a prescribed communication protocol, such as the ECHONET Lite or the ZigBee (registered trademark).

In the first embodiment, the control unit 230 instructs, to the fuel cell unit 150, the operation mode of the fuel cell unit 150 by making transmission unit 220 transmit a command complying with a prescribed communication protocol. In the first embodiment, the operation mode of the fuel cell unit 150 includes the power generation mode (i.e., load following control), the idling mode and the constant temperature mode as described above.

When the power output from the fuel cell 151 (i.e., the cell stack 151B) exceeds a prescribed threshold value, the control unit 230 controls the fuel cell unit 150 to operate in the power generation mode. On the other hand, when, for example, the power output from the fuel cell 151 (i.e., the cell stack 151B) is smaller than a prescribed threshold value, the control unit 230 controls the fuel cell unit 150 to operate in the constant temperature mode. Further, the control unit 230 controls the fuel cell unit 150 to operate in the idling mode in case of a power failure, for example.

(Control Method)

Figure 5:
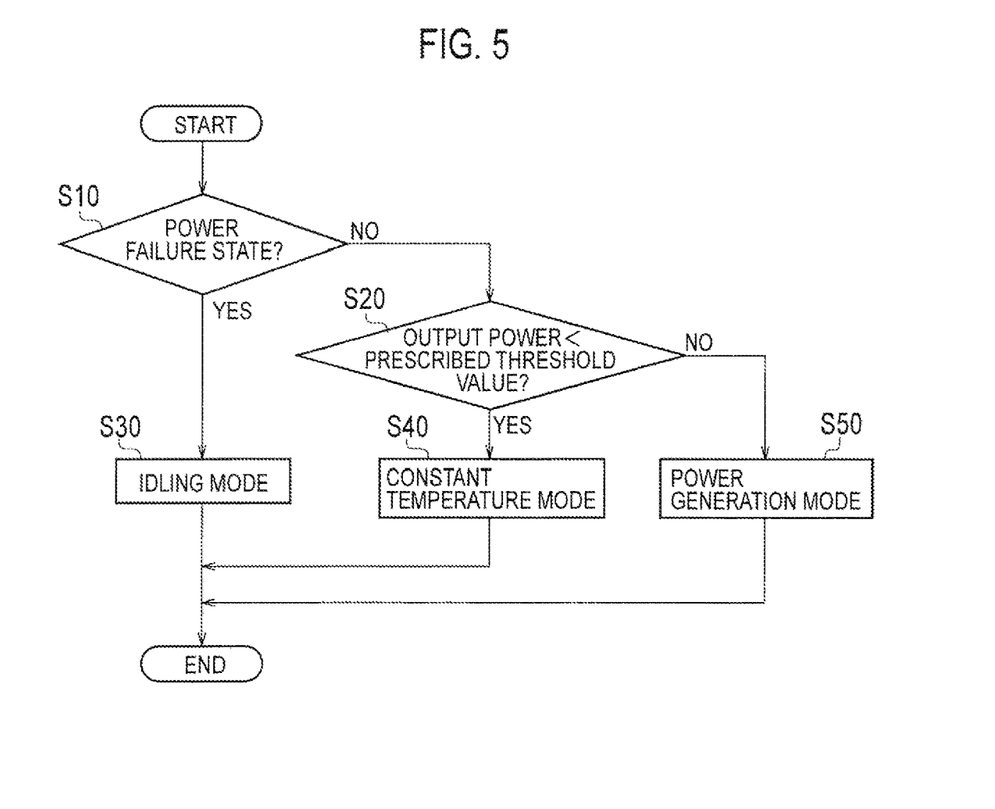
FIG. 5 is a flowchart illustrating a control method according to the first embodiment.

Hereinafter, a control method according to the first embodiment will be described. FIG. 5 is a flowchart illustrating the control method according to the first embodiment.

As shown in FIG. 5, in step S10, EMS 200 determines whether current state is power failure state. If the determination result is "YES" and if a power failure state of the grid is detected, a process of step S30 is performed immediately. If the determination result is "NO," a process in step S20 is performed.

In step S20, the EMS 200 determines whether power output from the fuel cell 151 (i.e., the cell stack 151B) is equal to or smaller than a prescribed threshold value. If the determination result is "YES," a process in step S40 is performed. If the determination result is "NO," a process in step S50 is performed.

In step S30, the EMS 200 controls the fuel cell unit 150 to operate in the idling mode. Therefore, even if the grid is in a power failure state and power supply from the grid is not able to be received, the operation can be continued.

For example, even if the grid is in a power failure state during an operation in the constant temperature mode and the auxiliaries is not able to receive power supply from the grid, since power generation in the fuel cell 151 (i.e., the cell stack 151B) is a chemical reaction, the power generation is not stopped immediately. That is, even if a power failure occurs and power supply from the grid to the auxiliaries is stopped, a chemical reaction continues to such a degree that power consumption of the auxiliaries is covered for the time being. Therefore, even if a power failure occurs during the operation in the constant temperature mode, the operation can be continued by covering power consumption of the auxiliaries by the power output from the fuel cell 151 (i.e., the cell stack 151B) and assisting, by the auxiliaries, the operation of the fuel cell 151 (i.e., the cell stack 151B). Therefore, power output from the fuel cell 151 (i.e., the cell stack 151B) is supplied to the auxiliaries in the idling mode, but power supply to the load 120 is not performed basically.

In step S40, the EMS 200 controls the fuel cell unit 150 to operate in the constant temperature mode. As described above, power consumption of the auxiliaries is covered by the power supplied from the outside in the constant temperature mode and the temperature of the cell stack 151B is kept constant within the prescribed temperature range. In the constant temperature mode, the power output from the fuel cell 151 is at least smaller than the power consumption of the auxiliaries and may be zero.

In step S50, the EMS 200 controls the fuel cell unit 150 to operate in the power generation mode. In the power generation mode, the auxiliaries is controlled to follow power consumption of the load 120 connected to the fuel cell unit 150 and the output from the fuel cell 151 is adjusted.

As described above, in the first embodiment, the operation modes including the constant temperature mode are introduced. Therefore, even in a case where the fuel cell unit 150 is made not to stop completely as much as possible in order to secure load followability, fuel gas supplied to the fuel cell unit 150 can be saved in the constant temperature mode.

Second Embodiment

Hereinafter, a control apparatus according to a second embodiment will be described. In the following description, description on the same configuration as that of the first embodiment will be suitably omitted.

In the first embodiment, the EMS 200 (i.e., the control unit 230) instructed the operation mode depending on whether the power output from the fuel cell 151 (i.e., the cell stack 151B) exceeds the prescribed threshold value. In contrast, in the second embodiment, regarding each of operation modes of a fuel cell unit 150, a control unit 230 calculates cost of fuel required for the fuel cell unit 150 to cover power consumption of the load 120 and cost of power supplied from a power source other than the fuel cell unit 150, and instructs a low-cost operation mode based on the calculated cost.

In particular, the cost of the fuel which the fuel cell unit 150 requires refers to as the purchase cost of the fuel gas supplied to the fuel cell unit 150 for the power generation in the cell stack 151B. Further, the cost of the power supplied from the power source other than the fuel cell unit 150 refers to as the purchase cost of power from the grid. Here, the power source other than the fuel cell unit 150 includes, for example, the PV unit 130 or the storage battery unit 140 but the power source is excluded in terms of cost calculation.

The cost in the power generation mode refers to the cost of the fuel gas supplied to the fuel cell unit 150. The cost in the idling mode refers to the total value of the cost of the fuel gas supplied to the fuel cell unit 150 and the cost of the power supplied to the load 120 from the grid. The cost in the constant temperature mode refers to the total value of the cost of the fuel gas supplied to the fuel cell unit 150 and the cost of the power supplied to the auxiliaries and the load 120 from the grid. The control unit 230 controls the fuel cell unit 150 to operate the lowest-cost operation mode.

In the second embodiment, the control unit 230 may control the fuel cell unit 150 to operate in the idling mode in case of a power failure, for example.

In the second embodiment, when power consumption of the load 120 is smaller than a prescribed threshold value, regarding each of the constant temperature mode and the idling mode, the control unit 230 may calculate cost of fuel required for the fuel cell unit 150 and cost of power supplied from a power source other than the fuel cell unit 150, and instructs a low-cost operation mode based on the calculated cost.

Figure 6:
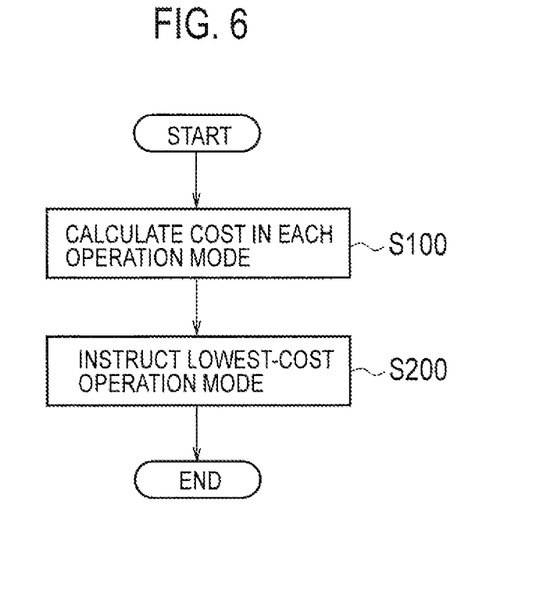
FIG. 6 is a flowchart illustrating a control method according to a second embodiment.

Next, the control method according to the second embodiment will be described. FIG. 6 is a flowchart illustrating the control method according to the second embodiment.

As illustrated in FIG. 6, in step S100, the EMS 200 calculates cost in each mode of the fuel cell unit 150. The operation mode of the fuel cell unit 150 includes, as described above, the power generation mode, the idling mode and the constant temperature mode.

In step S200, the EMS 200 instructs the lowest-cost operation mode based on the cost calculated by the step S100. The EMS 200 also determines whether a current state is a power failure state and, if the determination result is "YES," the EMS 200 may control the fuel cell unit 150 to operate in the idling mode.

In step S200, if the EMS 200 determines that the idling mode is the lowest-cost operation mode, the EMS 200 controls the fuel cell unit 150 to operate in the idling mode. As described above, in the idling mode, control is made so that power is output from the fuel cell 151 (i.e., the cell stack 151B) in accordance with power consumption of the auxiliaries.

In step S200, if the EMS 200 determines that the constant temperature mode is the lowest-cost operation mode, the EMS 200 controls the fuel cell unit 150 to operate in the constant temperature mode. As described above, in the constant temperature mode, power consumption of the auxiliaries is covered by power supplied from a power source other than the fuel cell unit 150 (for example, the grid, the PV unit 130 or the storage battery unit 140) and the temperature of the cell stack 151B is kept constant within the prescribed temperature range. In the constant temperature mode, the power output from the fuel cell 151 is at least smaller than the power consumption of the auxiliaries and may be zero.

In step S200, if the EMS 200 determines that the power generation mode is the lowest-cost operation mode, the EMS 200 controls the fuel cell unit 150 to operate in the power generation mode. In the power generation mode, the auxiliaries is controlled to follow power consumption of the load 120 connected to the fuel cell unit 150 and the output from the fuel cell 151 is adjusted.

As described above, in the second embodiment, the EMS 200 controls the fuel cell unit 150 to operate in the low-cost operation mode. For example, in a time range in which power consumption of the load 120 is substantially zero and the purchase unit price of power from the grid is low (for example, at night), there is a case in which the cost for covering the power consumption of the auxiliaries and the load 120 by the power supplied from the grid is lower than the cost for covering the power consumption of the auxiliaries and the load 120 by the output power from the fuel cell 151 (i.e., the cell stack 151B). In such a case, the control unit 230 controls the fuel cell unit 150 to operate in the constant temperature mode, whereby the cost is reduced while preventing the fuel cell unit 150 from completely stopping in order to secure load followability.

Other Embodiment

Although the present invention has been described with reference to the embodiment described above, it should not be understood that the discussion and drawings constituting a part of the disclosure are limiting the present invention. Various alternative embodiments, examples and operation technology will be apparent to a person skilled in the art from the present disclosure.

For example, although the fuel cell unit 150 operates in the idling mode while the grid is in the power failure state, supposing that there is power demand in the load, the fuel cell unit 150 may operate in an independent operation mode for outputting power corresponding to the demand. In the independent operation mode, the fuel cell unit 150 increases the output of the fuel cell 151 so that the fuel cell 151 not only itself supplies the auxiliaries with power but obtains output power corresponding to the demand of the load connected to the fuel cell unit 150.

In the embodiment, the EMS 200 has been described to instruct the operation mode of the fuel cell unit 150 based on the amount of generated power or the cost of the fuel cell 151, but this is not restrictive. The EMS 200 may instruct the operation mode of the fuel cell unit 150 based, for example, on an amount of hot water stored in a hot water storage tank of the hot water storage unit 160.

In the embodiment, the fuel cell 151 has been described as a SOFC (Solid Oxide Fuel Cell) fuel cell, but this is not restrictive. The fuel cell 151 may be, for example, a PEFC (Polymer Electrolyte Fuel Cell) fuel cell.

Although the control apparatus is the EMS 200 in the embodiment, the embodiment is not limited to the same. The control apparatus may also be the PCS 152 or the control substrate 156.

The EMS 200 may be a HEMS (Home Energy Management System), a SEMS (Store Energy Management System), a BEMS (Building Energy Management System) or an FEMS (Factory Energy Management System).

In the embodiment, the consumer's facility 10 is provided with the load 120, the PV unit 130, the storage battery unit 140, the fuel cell unit 150 and the hot water storage unit 160. However, it is only necessary that the consumer's facility 10 is provided at least with the load 120 and the fuel cell unit 150.

As described above, as for the present invention, it is needless to mention that various embodiments that are not described here are included. Moreover, it is also possible to combine the above-described embodiments and modifications. Accordingly, the technical range of the present invention is to be defined only by the inventive specific matter according to the adequate claims from the above description.

It is noted that the entire content of Japan Patent Application No. 2012-144815 (filed on Jun. 27, 2012) and Japan Patent Application No. 2012-167809 (filed on Jul. 27, 2012) are incorporated in the present application by reference.

INDUSTRIAL APPLICABILITY

According to the present invention, it is possible to provide a control apparatus, a fuel cell unit and control method capable of sufficiently saving fuel.

The invention claimed is:

1. A control apparatus which controls a fuel cell unit provided with a power generation unit which generates power upon chemical reaction and auxiliaries which assists an operation of the power generation unit, comprising:
    a control unit which instructs a constant temperature mode to the fuel cell unit as one of operation modes,
    the constant temperature mode being a mode for performing a control to cover power consumption of the auxiliaries by power supplied from the outside and an control to keep a temperature of the entire power generation unit provided in the fuel cell unit constant within a prescribed temperature range,
    wherein in the constant temperature mode, power output from the entire power generation unit provided in the fuel cell unit is at least smaller than the power consumption of the auxiliaries.

2. The control apparatus according to claim 1, wherein the prescribed temperature range is lower than a power generation temperature at the time of generating power in the power generation unit.

3. The control apparatus according to claim 2,
    wherein the control unit instructs a power generation mode as one of the operation mode,
    the power generation mode being a mode for controlling power output from the power generation unit so as to follow power consumption of a load connected to the fuel cell unit and,
    the control unit instructs to set the operation mode of the fuel cell unit to the constant temperature mode, when power output from the power generation unit in the power generation mode is smaller than a prescribed threshold value.

4. The control apparatus according to claim 2,
    wherein the control unit instructs an idling mode as one of the operation mode,
    the idling mode is a mode for outputting power from the power generation unit in accordance with the power consumption of the auxiliaries.

5. The control apparatus according to claim 4, wherein the control unit instructs to set the operation mode of the fuel cell unit to the idling mode in case of a power failure.

6. The control apparatus according to claim 1, wherein the power generation unit includes a SOFC fuel cell.

7. The control apparatus according to claim 2, wherein the power generation temperature is 650 to 1000° C. and the prescribed temperature range is 450 to 600° C.

8. The control apparatus according to claim 2, wherein an amount of fuel gas supplied to the fuel cell unit in the constant temperature mode is smaller than an amount of fuel gas supplied to the fuel cell unit in the power generation mode.

9. The control apparatus according to claim 1,
    wherein the control unit instructs a power generation mode as one of the operation mode,
    the power generation mode is a mode for controlling power output from the power generation unit so as to follow power consumption of a load connected to the fuel cell unit, and the control unit calculates cost of fuel required for the fuel cell unit to cover power consumption of the load and cost of power supplied from a power source other than the fuel cell unit, for each of the operation modes of the fuel cell unit, and instructs a low-cost operation mode based on a calculated cost.

10. The control apparatus according to claim 1,
wherein the control unit instructs an idling mode as one of the operation mode, the idling mode is a mode for outputting power from the power generation unit in accordance with the power consumption of the auxiliaries and, the control unit calculates cost of fuel required for the fuel cell unit and cost of power supplied from a power source other than the fuel cell unit, for each of the constant temperature mode and the idling mode, when power consumption of the load is smaller than a prescribed threshold value, and instructs a low-cost operation mode based on a calculated cost.

11. A fuel cell unit provided with a power generation unit which generates power upon chemical reaction and auxiliaries which assists an operation of the power generation unit, comprising:

a control unit configured to control the fuel cell unit according to operation modes including a power generation mode and a constant temperature mode, the power generation mode being a mode for positively performing power generation by the power generation unit, the constant temperature mode being a mode for keeping a temperature of the entire power generation unit provided in the fuel cell unit constant within a prescribed temperature range while covering power consumption of the auxiliaries by power supplied from the outside, wherein in the constant temperature mode, power output from the entire power generation unit provided in the fuel cell unit is at least smaller than the power consumption of the auxiliaries.

12. The fuel cell unit according to claim 11,
wherein the control unit calculates cost of fuel required for the fuel cell unit to cover power consumption of the load and cost of power supplied from a power source other than the fuel cell unit, for each of the operation modes of the fuel cell unit, and instructs a low-cost operation mode based on a calculated cost.

13. A control method for controlling a fuel cell unit provided with a power generation unit which generates power upon chemical reaction and auxiliaries which assists an operation of the power generation unit, comprising:

a step of instructing one of operation modes of the fuel cell unit, wherein the operation modes of the fuel cell unit includes a constant temperature mode that is a mode for performing a control to cover consumption of the auxiliaries by power supplied from the outside and a control to keep a temperature of the entire power generation unit provided in the fuel cell unit constant within a prescribed temperature range and, in the constant temperature mode, power output from the entire power generation unit provided in the fuel cell unit is at least smaller than the power consumption of the auxiliaries.

14. The control method according to claim 13,
wherein the operation modes of the fuel cell unit includes a power generation mode that is a mode for controlling power output from the power generation unit so as to follow power consumption of a load connected to the fuel cell unit and, the step includes a step of calculating cost of fuel required for the fuel cell unit to cover power consumption of the load and cost of power supplied from a power source other than the fuel cell unit, for each of the operation modes of the fuel cell unit, and a step of instructing a low-cost operation mode based on the calculated cost.

* * * * *